US008195234B2

(12) United States Patent
Chang et al.

(10) Patent No.: US 8,195,234 B2
(45) Date of Patent: Jun. 5, 2012

(54) METHODS FOR SHARING MOBILITY STATUS BETWEEN SUBSCRIBER IDENTITY CARDS AND SYSTEMS UTILIZING THE SAME

(75) Inventors: Chia-Lan Chang, Taipei County (TW); Chen-Hsuan Lee, Taipei (TW); Ming-Wan Hsu, Taipei (TW); I-Ching Niu, Taipei County (TW); Ding-Chiang Tang, Taipei (TW)

(73) Assignee: Mediatek Inc., Hsin-chu (TW)

( * ) Notice: Subject to any disclaimer, the term of this patent is extended or adjusted under 35 U.S.C. 154(b) by 772 days.

(21) Appl. No.: 12/235,070

(22) Filed: Sep. 22, 2008

(65) Prior Publication Data

US 2010/0075716 A1 Mar. 25, 2010

(51) Int. Cl.
*H04Q 7/20* (2006.01)
(52) U.S. Cl. .......... 455/558; 455/550.1; 455/432.1; 455/552.1; 455/432.2; 455/412.1; 370/310; 370/328; 370/329; 370/343; 379/433.01; 379/433.09
(58) Field of Classification Search .......... 455/558, 455/550, 552.1, 553.1, 412.1, 412.2, 435.1–435.3, 455/414.1–414.4, 426.1, 426.2, 445, 432.1; 370/310, 328, 329, 343
See application file for complete search history.

(56) References Cited

U.S. PATENT DOCUMENTS

| 6,185,436 | B1 * | 2/2001 | Vu .................................. 455/558 |
| 2003/0125073 | A1 * | 7/2003 | Tsai et al. ...................... 455/552 |
| 2003/0129971 | A1 * | 7/2003 | Gopikanth .................... 455/414 |
| 2008/0220778 | A1 * | 9/2008 | Ekstedt et al. ................. 455/436 |

OTHER PUBLICATIONS

ARIB STD-T63-25.304 V4.5.0 UE Procedures in Idle Mode and Procedures for Cell Reselection in Connected Mode (Release 4).

* cited by examiner

*Primary Examiner* — Keith Ferguson
(74) *Attorney, Agent, or Firm* — Thomas|Kayden (57) ABSTRACT

A method for sharing a mobility status in a mobile station with a first subscriber identity card and a second subscriber identity card is provided. The mobility status indicating the movement extent of the mobile station is obtained by the first subscriber identity card being currently camping on a first cell of a first network operator. Settings corresponding to a mobility-dependent procedure for the second subscriber identity card being currently failure to camp on any second cell of a second network operator are configured, thereby enabling the mobility-dependent procedure to be performed with consideration of the obtained mobility status.

20 Claims, 9 Drawing Sheets

METHODS FOR SHARING MOBILITY STATUS BETWEEN SUBSCRIBER IDENTITY CARDS AND SYSTEMS UTILIZING THE SAME

BACKGROUND OF THE INVENTION

1. Field of the Invention

The invention relates to a method for sharing mobility status between the subscriber identity cards, and more particularly to a method for sharing mobility status in a system with the subscriber identity cards provided by different network operators.

2. Description of the Related Art

Currently, the Global System for Mobile communication (GSM) standard is the popular standard for mobile phones in the world. The GSM standard, standardized by the European Telecommunication Standards Institute (ETSI) is a cellular network structure and a Time Division Multiple Access (TDMA) system. For a carrier frequency, the TDMA system will divide a frame into eight time slots, wherein each time slot is used to transmit a channel data for a subscriber. Meanwhile, one of the available technologies of a GSM network is the General Packet Radio Service (GPRS) technology. The GPRS technology utilizes the unused channels in the GSM network to provide moderate speed data transmission. The Wideband Code Division Multiple Access (W-CDMA) system is a wideband spread-spectrum mobile air interface that utilizes the direct-sequence spread spectrum method of asynchronous code division multiple access to achieve higher speeds and support more users compared to the implementation of the time division multiple access (TDMA) system used by 2G GSM networks. Time Division-Synchronous Code Division Multiple Access (TD-SCDMA) system is another type of 3G mobile telecommunications standard.

A dual SIM mobile phone is a phone with two Subscriber Identity Modules (SIMs), which correspond to different telephone numbers. The dual SIM mobile phone allows a user to use two communication services without carrying two phones at the same time. For example, the same mobile phone may be used for business and private use with separate numbers and bills, thus providing convenience to mobile phone users.

BRIEF SUMMARY OF THE INVENTION

Methods for sharing a mobility status between subscriber identity cards and the systems utilizing the same are provided. An exemplary embodiment of a method for sharing a mobility status in a mobile station with a first subscriber identity card and a second subscriber identity card is provided. The mobility status indicating the movement extent of the mobile station is obtained by the first subscriber identity card being currently camping on a first cell of a first network operator. Settings corresponding to a mobility-dependent procedure for the second subscriber identity card being currently failure to camp on any second cell of a second network operator are configured, thereby enabling the mobility-dependent procedure to be performed with consideration of the obtained mobility status.

Furthermore, an exemplary embodiment of a method for sharing a mobility status in a mobile station with a first subscriber identity card and a second subscriber identity card is provided. The mobility status indicating the movement extent of the mobile station is obtained by the first subscriber identity card being currently camping on a first cell of a first network operator. Settings corresponding to a mobility-dependent procedure for the second subscriber identity card being currently camping on a second cell of a second network operator are configured, thereby enabling the mobility-dependent procedure to be performed with consideration of the obtained mobility status.

Moreover, an exemplary embodiment of a system comprises a first subscriber identity card, a second subscriber identity card and a processor. The first subscriber identity card is currently camping on a first cell of a first network operator. The processor obtains a mobility status indicating the movement extent of the mobile station by the first subscriber identity card, and configures settings corresponding to a mobility-dependent procedure for the second subscriber identity card, thereby enabling the mobility-dependent procedure to be performed with consideration of the obtained mobility status.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

A subscriber identity module (SIM) card typically contains user account information, an international mobile subscriber identity (IMSI) and a set of SIM application toolkit (SAT) commands and provides storage space for phone book contacts. A micro control unit (MCU) of the Baseband chip (simply referred to as a Baseband MCU hereinafter) may interact with MCUs of the SIM cards (each simply referred to as a SIM MCU hereinafter) to fetch data or SAT commands from the plugged in SIM cards. A mobile station is immediately programmed after plugging in the SIM card. SIM cards may also be programmed to display custom menus for personalized services.

A universal SIM (USIM) card is inserted in a mobile station for universal mobile telecommunications system (UMTS) (also called 3G) telephony communications. The USIM card stores user account information, an IMSI, authentication information and a set of USIM Application Toolkit (USAT) commands and provides storage space for text messages and phone book contacts. A Baseband MCU may interact with an MCU of the USIM card (each simply referred to as a USIM MCU hereinafter) to fetch data or SAT commands from the plugged in USIM cards. The phone book on the USIM card has been greatly enhanced when compared to the SIM card. For authentication purposes, the USIM card may store a long-term preshared secret key K, which is shared with the Authentication Center (AuC) in the network. The USIM MCU may verify a sequence number that must be within a range using a window mechanism to avoid replay attacks, and is in charge of generating the session keys CK and IK to be used in the confidentiality and integrity algorithms of the KASUMI (also termed A5/3) block cipher in the UMTS. A mobile station is immediately programmed after plugging in the USIM card.

A removable User Identity Module (R-UIM) or a Code Division Multiple Access (CDMA) Subscriber Identity Module (CSIM) card has been developed for a CDMA mobile station and is equivalent to the GSM SIM and 3G USIM except that it is capable of working in CDMA networks. The R-UIM or the CSIM card is physically compatible with the GSM SIM card, and provides similar security mechanisms for the CDMA system. The IMSI is a unique number associated with a global system for mobile communication (GSM) or a universal mobile telecommunications system (UMTS) network user. The IMSI may be sent by a mobile station to a GSM or UMTS network to acquire other details of the mobile user in the Home Location Register (HLR) or as locally copied in the Visitor Location Register (VLR). An IMSI is typically 15 digits long, but may be shorter (for example MTN South Africa's IMSIs are 14 digits). The first 3 digits are the Mobile Country Code (MCC), which are followed by the Mobile Network Code (MNC), either 2 digits (European standard) or 3 digits (North American standard). The remaining digits are the mobile subscriber identification number (MSIN) for a GSM or UMTS network user.

Figure 1:
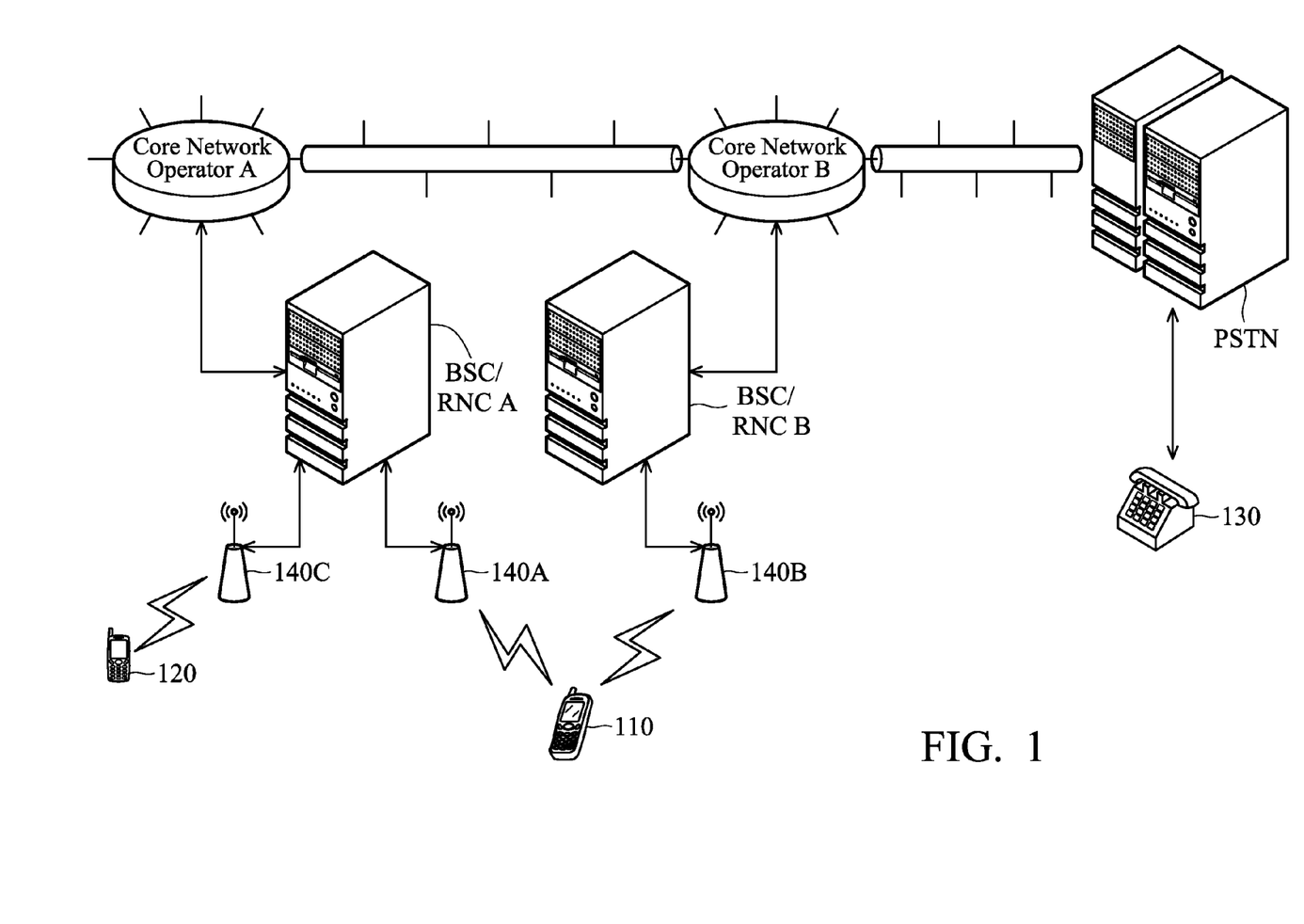
FIG. 1 shows a schematic diagram of a mobile communication network system.

FIG. 1 shows a schematic diagram of a mobile communication network system. In FIG. 1, a mobile station (may be called user equipment interchangeably) 110 with dual subscriber identity cards A and B may simultaneously access two core networks such as Global System for Mobile Communications (GSM), Wideband Code Division Multiple Access (WCDMA), Time Division-Synchronous Code Division Multiple Access (TD-SCDMA) and the like after camping on two cells 140A and 140B (i.e. each may be a base station, a node-B or others). The subscriber identity card may be a SIM, USIM, R-UIM or CSIM card. The mobile station 110 may make a voice or data call to a called party 120 or 130 through the GSM network with the Base Station Controller (BSC), WCDMA/TD-SCDMA network with Radio Network Controller (RNC), Public Switched Telephone Network (PSTN) or any combinations thereof using either subscriber identity cards A or B. For example, the mobile station 110 may make a voice call with the subscriber identity card A to the called party 120 via the cell 140A, an BSC/RNC A and a cell 140C or make a voice call with the subscriber identity card B to the called party 120 via the cell 140B, an BSC/RNC B, a core network operator B, a core network operator A, the BSC/RNC A and the cell 140C. Moreover, the mobile station 110 may receive a phone call request with either subscriber identity card A or B from the calling party 120 or 130. For example, the mobile station 110 may receive a phone call request to the subscriber identity card B from the calling party 130 via a Public Switched Telephone Network (PSTN), the core network operator B, the BSC/RNC B and the cell 140B.

Figure 2A:
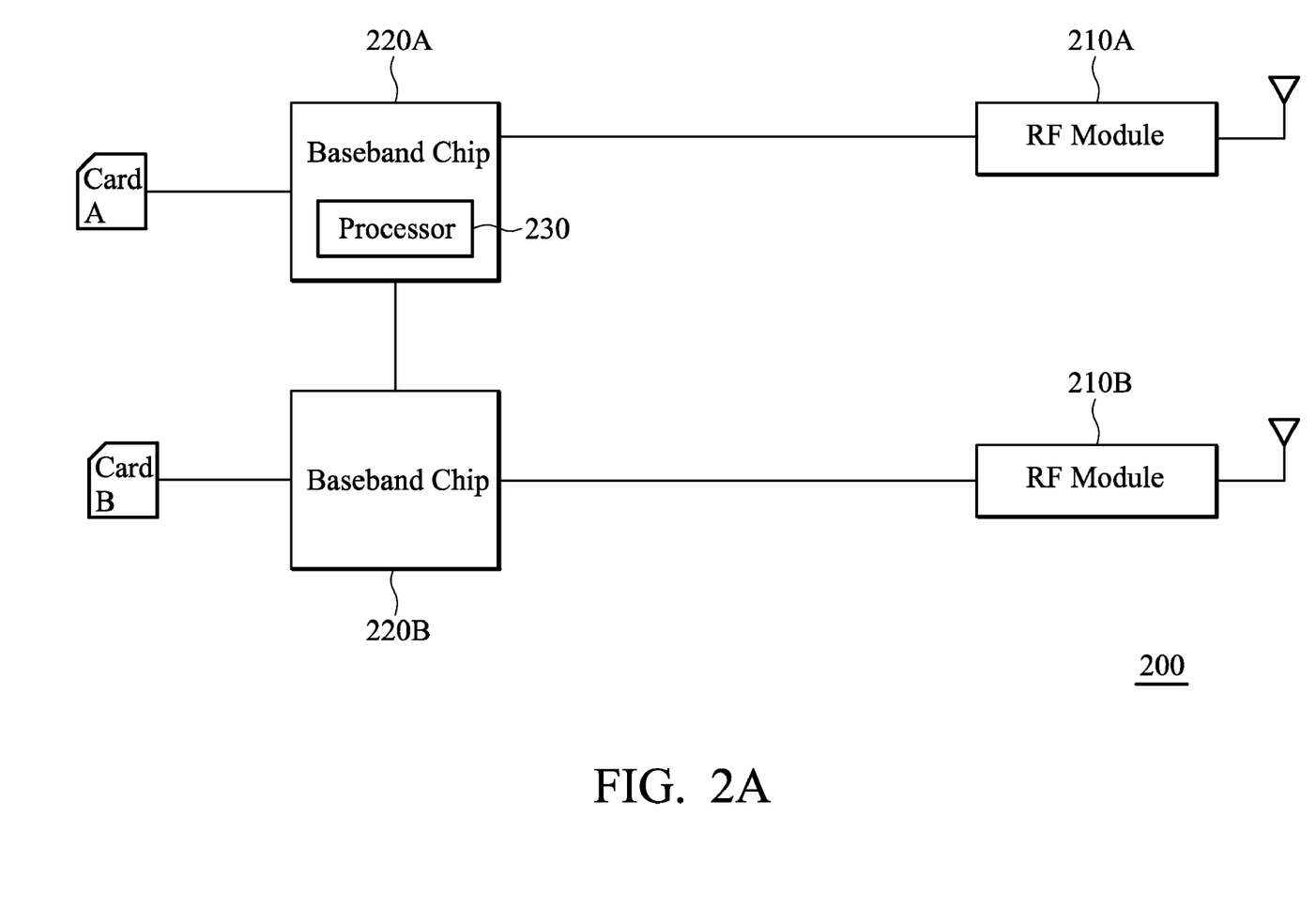
FIG. 2A shows a mobile station according to an embodiment of the invention.

FIG. 2A shows the hardware architecture of a mobile station 200 according to an embodiment of the invention. The mobile station 200 comprises two radio frequency (RF) modules 210A and 210B and two Baseband chips 220A and 220B, wherein the RF module 210A is coupled to the Baseband chip 220A and the RF module 210B is coupled to the Baseband chip 220B. Two subscriber identity cards A and B may be plugged into two sockets of the mobile station 200 connecting to the Baseband chips 220A and 220B, respectively. Each of the subscriber identity cards A and B may be a SIM, USIM, R-UIM or CSIM card, which is provided by a particular network operator. The mobile station 200 can therefore simultaneously camp on two cells provided by either the same network operator or different network operators for the plugged cards A and B and operate in stand-by/idle modes, or even dedicated modes, using different RF modules and Baseband chips. Each of the Baseband chips 220A and 220B may read data from a particular subscriber identity card A or B and write data to the subscriber identity card A or B. Furthermore, the Baseband chip 220A may be a master device for the mobile station 200, and the Baseband chip 220A comprises a processor 230 for controlling the communications between the subscriber identity cards A and B and the RF modules 210A and 210B. A further processor (not shown) may be provided in the Baseband chip 220B to coordinately operate with the processor 230 of the Baseband chip 220A. In this embodiment, the Baseband chip 220A may camp on a first cell corresponding to the subscriber identity card A via the RF module 210A, and the Baseband chip 220B may camp on a second cell corresponding to the subscriber identity card B via the RF module 210B, wherein the first and second cells may be provided by different network operators.

Figure 2B:
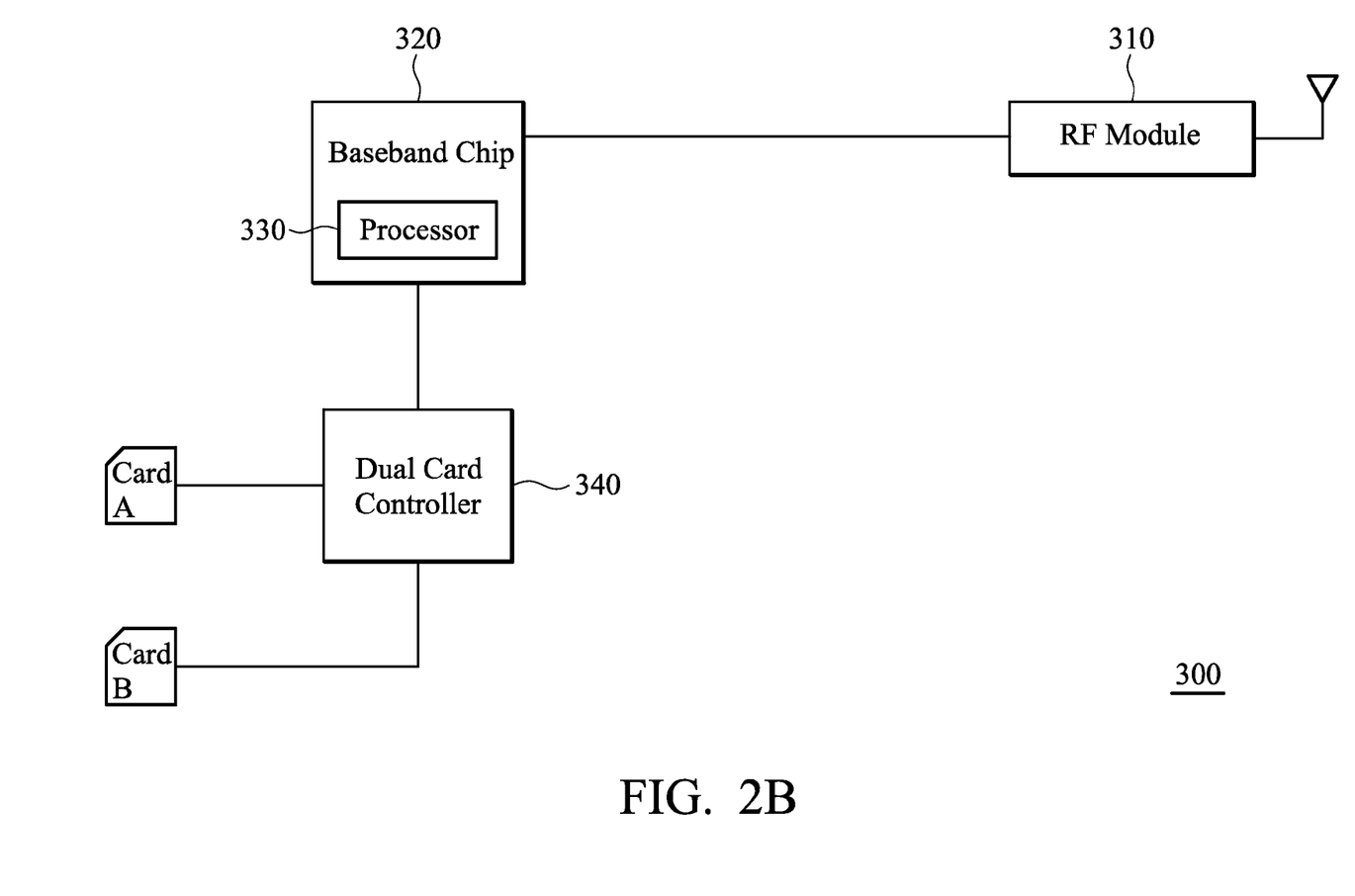
FIG. 2B shows a mobile station according to another embodiment of the invention.

FIG. 2B shows the hardware architecture of a mobile station 300 according to another embodiment of the invention. The mobile station 300 comprises an RF module 310, a Baseband chip 320 and a dual card controller 340, wherein the two subscriber identity cards A and B may be plugged into two sockets of the mobile station 300 connecting to the dual card controller 340. Those skilled in the art may practice the dual card controller 340 in the Baseband chip 320. Each of the subscriber identity cards A and B may be a SIM, USIM, R-UIM or CSIM card, which is provided by a particular network operator. The dual card controller 340 is coupled/connected between the Baseband chip 320 and the subscriber identity cards A and B. In this embodiment, the Baseband chip 320 may camp on a first cell corresponding to the subscriber identity card A and a second cell corresponding to the subscriber identity card B via the RF module 310 (the single RF module), wherein the first and second cells are provided by different network operators. Furthermore, the Baseband chip 320 comprises a processor 330 for controlling the communications between the subscriber identity cards A and B and the RF module 310. Moreover, the processor 330 of the Baseband chip 320 may read data from the subscriber identity card A or B via the dual card controller 340, and may also write data to the subscriber identity card A or B via the dual card controller 340.

As the mobile station equipped with two or more subscriber identity cards as shown in FIG. 2A or FIG. 2B, the mobile station can be operated in an idle mode and dedicated mode for each inserted subscriber identity card. Referring to FIG. 1, in an idle mode, the mobile station 110 is either powered off, searches for or measures the Broadcast Control Channel (BCCH) with better signal quality from a base station (e.g. the cell 140A or 140B) provided by a specific network operator, or is synchronized to the BCCH of a specific base station to be ready to perform a random access procedure on the Random Access Channel (RACH) for requesting a dedicated channel. In a dedicated mode, the mobile station 110 occupies a physical channel and tries to synchronize therewith, and establishes logical channels and switches throughout them.

Specifically, for each inserted subscriber identity card in the idle mode, the mobile station 110 continuously listens to the BCCH from a base station and reads the BCCH information and conducts periodic measurements of the signaling strength of the BCCH carriers in order to select a suitable cell to be camped on. In the idle mode, no exchange of signaling messages is presented with the network. The data required for Radio Resource Management (RRM) and other signaling procedures is collected and stored, such as the list of neighboring BCCH carriers, thresholds for RRM algorithms, Common Control Channel (CCCH) configurations, information regarding the use of RACH and Paging channel (PCH), or others. Such kind of information (e.g. system information (SI)) is broadcasted by a cell on the BCCH and provides information about the network configuration. Moreover, the SI is available for all mobile stations currently in the cell. The SI comprises a Public Land Mobile Network (PLMN) code uniquely owned by a network operator. The PLMN code comprising a Mobile Country Code (MCC) and a Mobile Network Code (MNC), indicating which network operator provides communication services. In addition, a cell identity (ID) indicating which cell is broadcasting the BCCH is also contained in the SI. Furthermore, the SI may comprise network identification, neighboring cells, channel availability and power control requirements etc. The PLMN code may be acquired and stored in a corresponding subscriber identity card of the electronic device upon receiving the SI from the BCCH. The BSS further continuously sends out, on all PCHs of a cell valid Layer 3, messages (PAGING REQUEST) which the mobile station 110 can decode and recognize if its address (e.g. its IMSI of a specific SIM card) is paged. The mobile station 110 periodical monitors the PCHs to avoid paging call loss.

Figure 3:
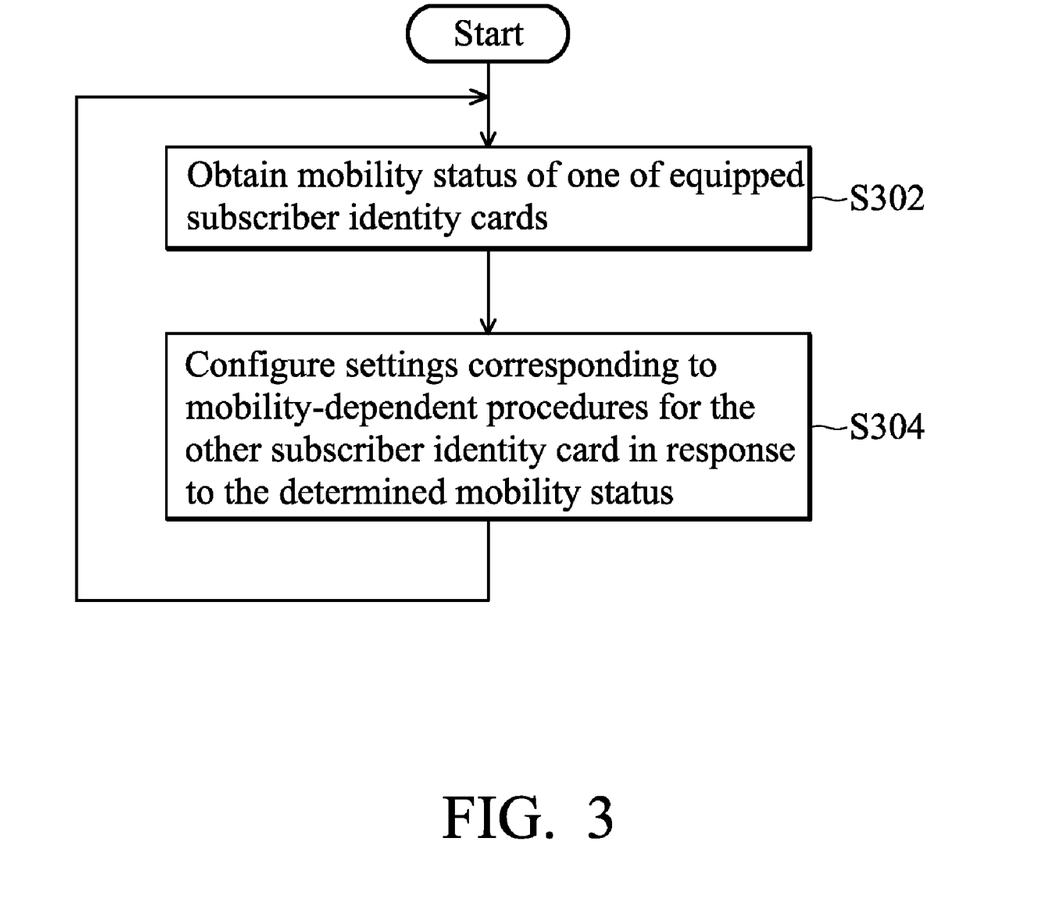
FIG. 3 shows a flow chart illustrating a method for sharing mobility statuses between two subscriber identity cards according to an embodiment of the invention

FIG. 3 shows a flow chart illustrating a method for sharing mobility statuses between two subscriber identity cards A and B, performed when executing software/firmware code by a processor of a mobile station (e.g. 200 of FIG. 2A or 300 of FIG. 2B), according to an embodiment of the invention. As described above, the subscriber identity card A and the subscriber identity card B are provided by different network operators, wherein the subscriber identity card A is provided by a first network operator and the subscriber identity card B is provided by a second network operator. When a mobility status (e.g. one of fast-moving, normal-moving and slow-moving modes, or whether the mobile station is cell changed, or others) of the subscriber identity card A is determined, performing a mobility-dependent procedure (e.g. cell measurement, cell reselection or PLMN recovery procedure, or others) for the subscriber identity card B may take the determined mobility status into account. First, the mobility status of the equipped subscriber identity card A is obtained (step S302). The mobile station may listen to a cell that the subscriber identity card A camps on and receive an SI from the BCH of the camped on cell, in which contains information regarding a mobility status indicating whether the subscriber identity card A is under a fast-moving, normal-moving or slow-moving mode. Decisions of fast-moving, normal-moving or slow-moving mode may be made by the first network operator according to a total number of cell reselections by the subscriber identity card A during a past time period. It is to be understood that the subscriber identity card A being under a fast-moving, normal-moving or slow-moving mode implies that the mobile station is fast-moved, normal-moved or slow-moved. Or, the mobile station may determine the subscriber identity card A is under a cell-changed mode when detecting that a primary synchronization code (PSC) or a carrier frequency of the received SI is changed. Or, the mobile station may continuously monitor a total number of cell reselections nCR for the subscriber identity card A for a past time period Tcrmax and accordingly obtain the mobility status therefor. For example, the mobile station obtains a fast-moving status when detecting seven or more cell reselections for a past time period (e.g. one ranging from 2 to 4 seconds), a normal-moving status when detecting that a total number of cell reselections is less than seven and larger than five for the past time period, and a slow-moving status when detecting five or less cell reselections for the past time period, respectively. And then, settings corresponding to one or more mobility-dependent procedures for the subscriber identity card B are configured in response to the determined mobility status (step S304). Details of the mobility-dependent procedure are to be described in the following paragraphs.

Figure 4:
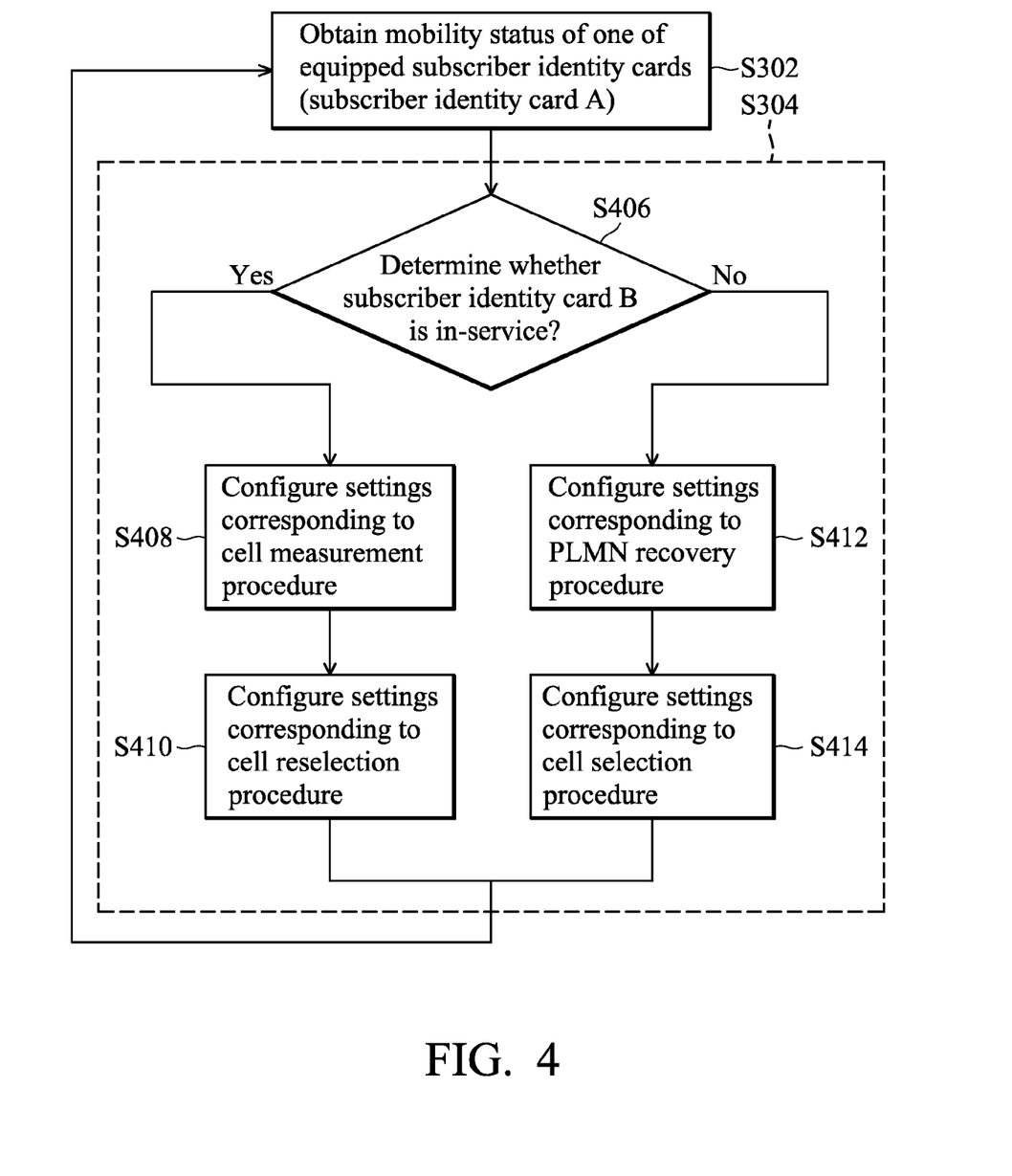
FIG. 4 shows a flow chart illustrating a method for sharing mobility status in a mobile station with a subscriber identity card A and a subscriber identity card B according to an embodiment of the invention.

FIG. 4 shows a flow chart illustrating a method for sharing mobility status in a mobile station with a subscriber identity card A and a subscriber identity card B, performed when executing software/firmware code by a processor of a mobile station (e.g. 200 of FIG. 2A or 300 of FIG. 2B), according to an embodiment of the invention. In this embodiment, the mobility status may indicate whether the subscriber identity card A is operating in a fast-moving mode or cell-changed mode (step S302). Next, it is determined whether the subscriber identity card B is in-service (step S406). The subscriber identity card B being in-service camps on a cell belonging to the second network operator while the subscriber identity card B not being in-service may be out-of-service (may be called limited service interchangeably) or PLMN loss (may be called no service interchangeably). Out-of-service means that the signaling strengths are too weak to camp on any cell of the second network operator for the subscriber identity card B at a moment. PLMN loss means that the subscriber identity card B has not camped on any cell for a predetermined time period. If the subscriber identity card B is in-service, the processor may configure settings corresponding to a cell measurement procedure (step S408) and a cell reselection procedure (step S410) for the subscriber identity card B with consideration of the obtained mobility status of the subscriber identity card A; otherwise, the processor may configure settings corresponding to a PLMN recovery procedure if the subscriber identity card B is PLMN loss (step S412) and a cell selection procedure if the subscriber identity card B is out-of-service (step S414) for the subscriber identity card B with consideration of the obtained mobility status of the subscriber identity card A. These procedures will be described in detail below.

Figure 5:
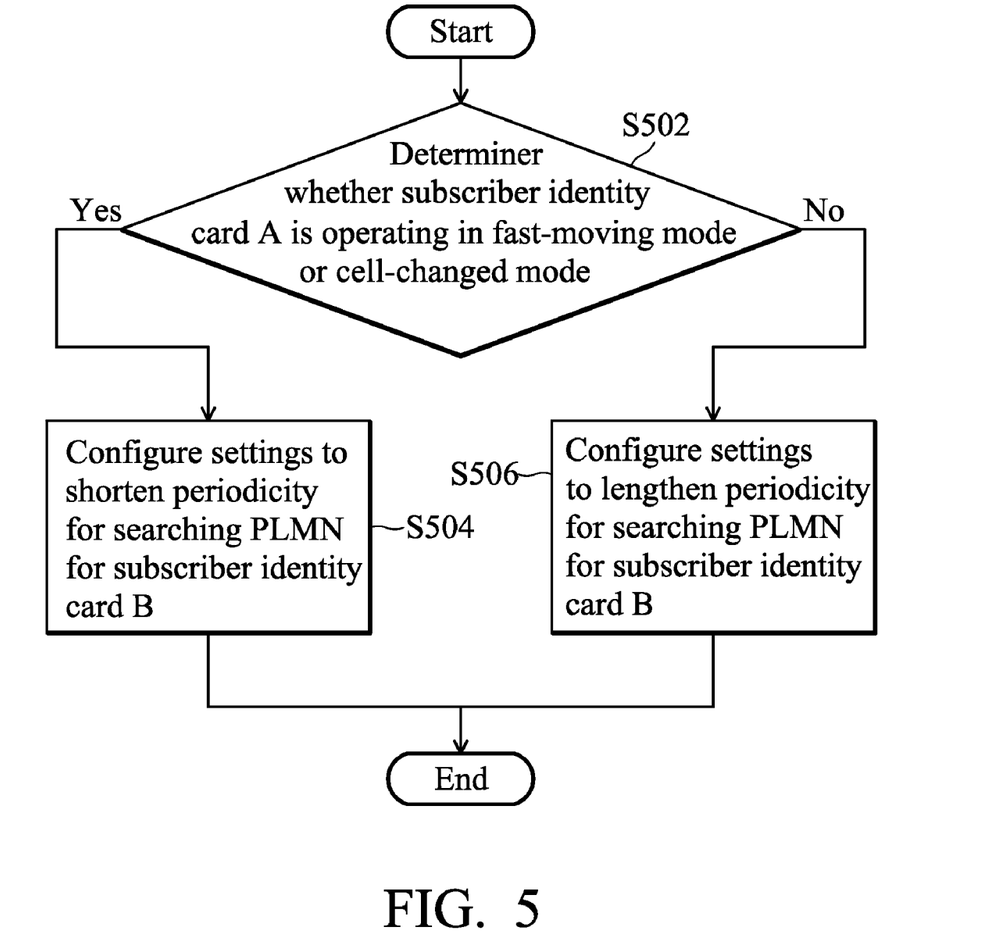
FIG. 5 shows a flow chart illustrating an embodiment of the PLMN recovery procedure according to the invention.

The mobility status of subscriber identity card A being in a fast-moving or cell-changed mode implies that the radio condition is changed rapidly. As the PLMN corresponding to the subscriber identity card B is loss, performing PLMN recovery more frequently may recover the lost PLMN earlier. On the other hand, the mobility status of subscriber identity card A being in a slow-moving or non-cell changed mode implies that radio condition is not dramatically changed. As the PLMN corresponding to the subscriber identity card B is loss, performing PLMN recovery less frequently may avoid a number of unnecessary PLMN recoveries, resulting in less power consumption. FIG. 5 shows a flow chart illustrating an embodiment of the PLMN recovery procedure, performed when executing software/firmware code by a processor of a mobile station, according to the invention. In this embodiment, no cell of the second network operator is camped on by the subscriber identity card B, which is PLMN loss currently. The processor may scan a frequency band to search a PLMN during every time interval $t_1$ in a time period TP1, and the processor may decrease the time interval $t_1$ and increase the time interval $t_1$. First, the processor may determine whether the subscriber identity card A is operating in a fast-moving mode or cell-changed mode according to the mobility status (step S502). If yes, the processor may configure settings to shorten the periodicity for searching a PLMN for the subscriber identity card B (step S504). If no, the processor may configure settings to lengthen the periodicity for searching the PLMN (step S506). Decreasing or increasing of the time interval $t_1$ may be achieved by shortening or lengthening a corresponding timer. Thereafter, the timer is periodically reset to count to the shortened/lengthened value and a PLMN recovery procedure is triggered each time the value is reached. In another embodiment, step S506 after determining that the subscriber identity card A is not operated in a fast-moving or cell-changed mode may be adapted. In the adapted step, it is further determined whether the subscriber identity card A is operated in a slow-moving mode. If yes, the processor lengthens the periodicity for searching a PLMN, otherwise, maintains the periodicity for performing PLMN recovery.

Figure 6:
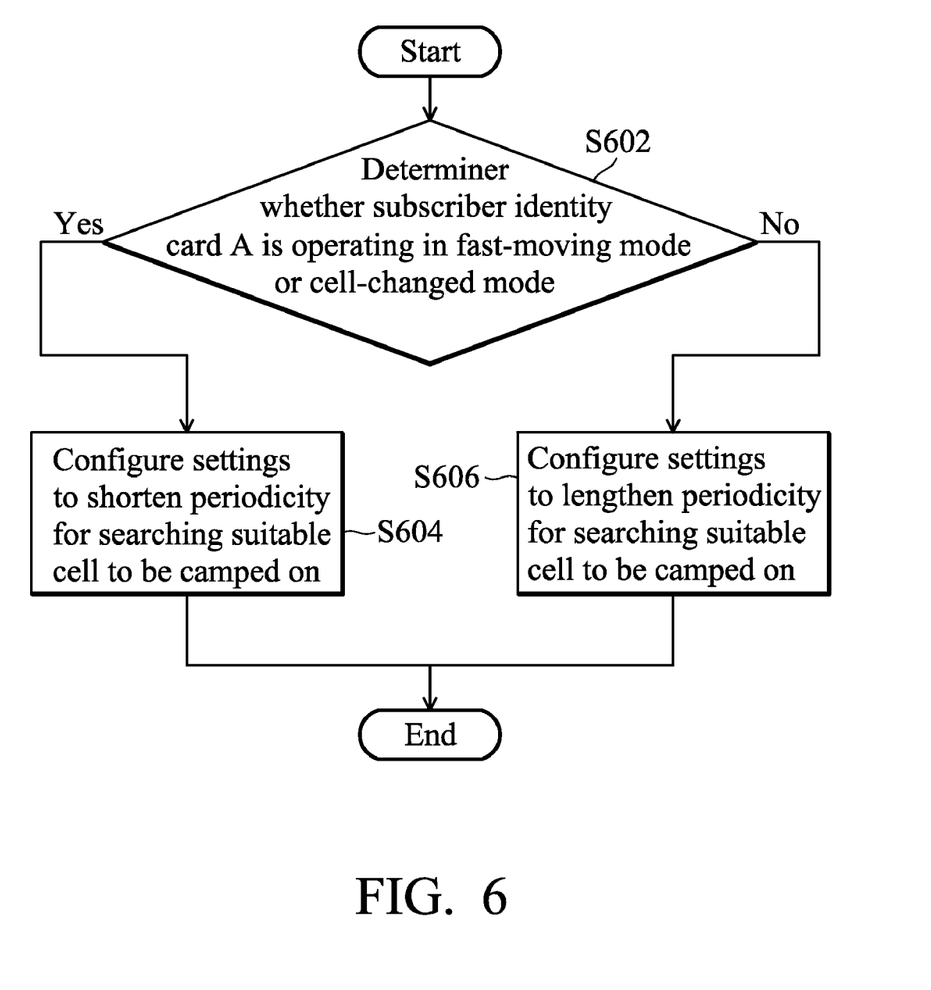
FIG. 6 shows a flow chart illustrating an embodiment of the cell selection procedure according to the invention.

As the subscriber identity card B is out-of-service and the mobility status of subscriber identity card A is in a fast-moving or cell-changed mode, performing cell search more frequently may regain the service earlier. On the other hand, as the subscriber identity card B is out-of-service and the mobility status of subscriber identity card A is in a slow-moving or non-cell changed mode, performing cell search less frequently may avoid a number of ones, resulting in less power consumption. For example, in UMTS, during the cell search, the mobile station searches for a cell and determines the downlink scrambling code and frame synchronization of that cell. FIG. 6 shows a flow chart illustrating an embodiment of the cell selection procedure, performed when executing software/firmware code by a processor of a mobile station, according to the invention. In this embodiment, no cell of the second network operator is camped on by the subscriber identity card B, which is out-of-service currently. The processor may search a suitable cell to regain services during every time interval $t_2$ in a time period TP2, and the processor may decrease the time interval $t_2$ and increase the time interval $t_2$. First, the processor may determine whether the subscriber identity card A is operating in a fast-moving mode or cell-changed mode according to the mobility status (step S602). If yes, the processor may configure settings to shorten the periodicity for searching for a suitable cell of the second network operator (step S604). If no, the processor may configure settings to lengthen the periodicity for searching for a suitable cell (step S606). Decreasing or increasing of the time interval $t_2$ may be achieved by shortening or lengthening a corresponding timer. Thereafter, the timer is periodically reset to count to the shortened/lengthened value and a cell search procedure is triggered each time the value is reached. In another embodiment, step S606 after determining that the subscriber identity card A is not operated in a fast-moving or cell-changed mode may be adapted. In the adapted step, it is further determined whether the subscriber identity card A is operated in a slow-moving mode. If yes, the processor lengthens the periodicity for searching a suitable cell corresponding to the second network operator to be camped on, otherwise, maintains the periodicity for performing cell search.

Figure 7:
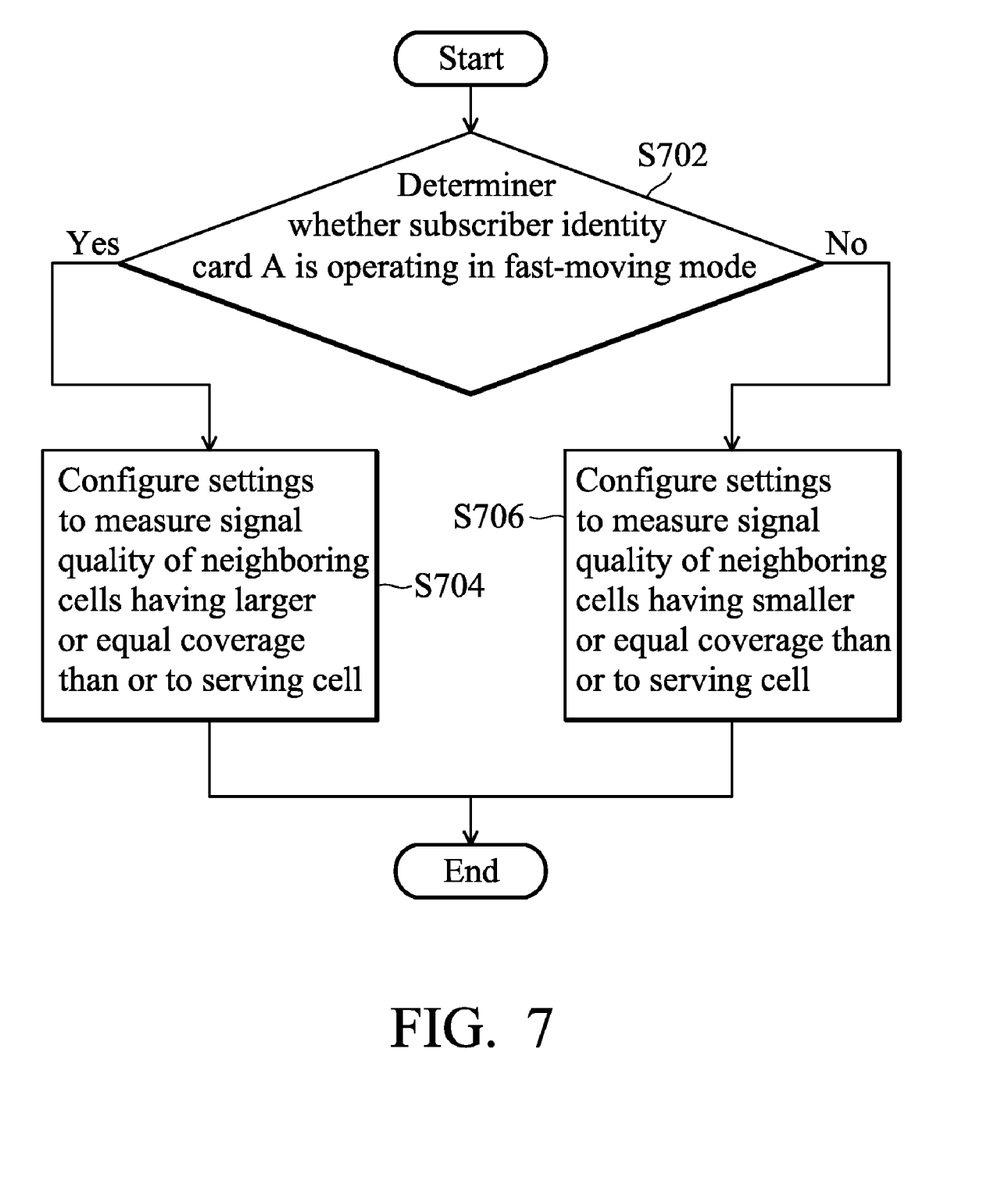
FIG. 7 shows a flow chart illustrating an embodiment of the cell measurement procedure according to the invention.

When camping on a cell, the mobile station may regularly search for a better cell according to the cell reselection criteria in an idle mode or paging mode. If the mobile station is moved, the current camped on cell may become unsuitable. Hence, the mobile station may perform a cell reselection procedure to reselect a suitable cell as a next serving cell. Furthermore, the mobile station may perform a cell measurement procedure to measure a signal quality/strength of each neighboring cell for a reference of the cell reselection procedure. As the subscriber identity card B is in-service and the mobility status of subscriber identity card A is in a fast-moving mode, camping on a larger cell may reduce the possibility of cell reselections or handovers, resulting in reduced power consumption or the possibility of call drops due to an unsuccessful handover. On the other hand, as the subscriber identity card B is in-service and the mobility status of subscriber identity card A is in a slow-moving mode, camping on a smaller cell may gain better communication quality. FIG. 7 shows a flow chart illustrating an embodiment of the cell measurement procedure, performed when executing software/firmware code by a processor of a mobile station, according to the invention. In this embodiment, the subscriber identity card B has camped on the serving cell of the second network operator with a good signal quality. Moreover, the processor may obtain the hierarchical cell structure (HCS) information of the serving cell and the neighboring cells from SI, which is received from BCH of the serving cell via the subscriber identity card B. The HCS information is used to describe the priority of cells for cell reselection, wherein each cell may be classified as different level according to its size. For example, a macro-cell is a larger cell and is optimized to provide larger coverage but worse communication capacity. A micro-cell is a relatively small cell than the macro-cell. A pico-cell is a relatively small cell than the micro-cell and is optimized to provide better communication capacity but smaller coverage. In FIG. 7, first, the processor may determine whether the subscriber identity card A is operating in a fast-moving mode according to the mobility status (step S702). If yes, the processor may configure settings to preferably measure the signal quality of the neighboring cells having larger or equal coverage than or to the serving cell for the subscriber identity card B (step S704). If no, the processor may configure settings to preferably measure the signal quality of neighboring cells having smaller or equal coverage than or to the serving cell for the subscriber identity card B (step S706). It is to be understood that the measurement results will be reported to the serving cell to facilitate a future cell reselection. In another embodiment, step S706 after determining that the subscriber identity card A is not operated in a fast-moving mode may be adapted. In the adapted step, it is further determined whether the subscriber identity card A is operated in a slow-moving mode. If yes, the processor may configure settings to measure the signal quality of neighboring cells having smaller or equal coverage than or to the serving cell for the subscriber identity card B, otherwise, the processor maintains the original settings.

Figure 8:
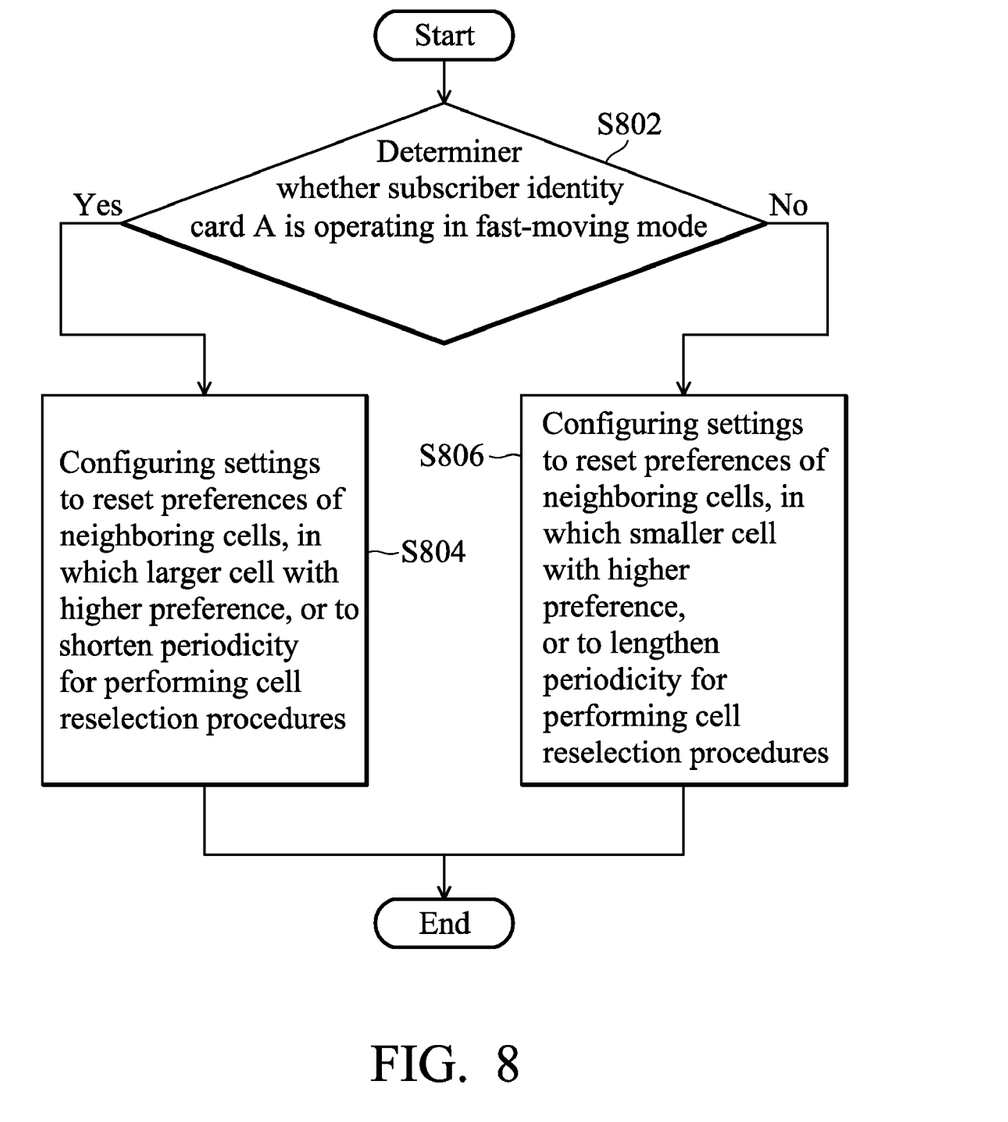
FIG. 8 shows a flow chart illustrating an embodiment of the cell reselection procedure according to the invention.

As the subscriber identity card B is in-service and the mobility status of subscriber identity card A is in a fast-moving mode, performing cell reselection more frequently may change cell earlier, resulting in better communication quality. On the other hand, as the subscriber identity card B is in-service and the mobility status of subscriber identity card A is in a slow-moving mode, performing cell reselection less frequently may avoid a number of unnecessary ones, resulting in less power consumption. FIG. 8 shows a flow chart illustrating an embodiment of the cell reselection procedure, performed when executing software/firmware code by a processor of a mobile station, according to the invention. In this embodiment, the subscriber identity card B has camped on the serving cell of the second network operator. As described above, the processor may obtain the HCS information to indicate the sizes of the serving cell and the neighboring cells. The processor may perform a cell reselection procedure during every time interval $t_3$ in a time period TP3, and the processor may decrease the time interval t3 and increase the time interval $t_3$. In FIG. 8, first, the processor may determine whether the subscriber identity card A is operating in a fast-moving mode according to the mobility status (step S802). If yes, for the subscriber identity card B, the processor may configure settings to reset preferences of the neighboring cells, in which a larger cell with a higher preference, so as to choose a larger cell to camp on during a future cell reselection procedure, or to shorten the periodicity for performing cell reselection procedures, or the combination (step S804). If no, for the subscriber identity card B, the processor may configure settings to reset preferences of the neighboring cells, in which a smaller cell with a higher preference, so as to choose a smaller cell to camp on during a future cell reselection procedure, or to lengthen the periodicity for performing cell reselection procedures, or the combination (step S806). Decreasing or increasing of the time interval $t_3$ may be achieved by shortening or lengthening a corresponding timer. Thereafter, the timer is periodically reset to count to the shortened/lengthened value and a cell reselection procedure is triggered each time the value is reached. In another embodiment, step S806 after determining that the subscriber identity card A is not operated in a fast-moving mode may be adapted. In the adapted step, it is further determined whether the subscriber identity card A is operated in a slow-moving mode. If yes, the processor may configure settings to reset preferences of the neighboring cells, in which a smaller cell with a higher preference, so as to choose a smaller cell to camp on during a future cell reselection procedure, or to lengthen the periodicity for performing cell reselection procedures, or the combination, otherwise, maintains the original preferences of neighboring cells and periodicity for performing cell reselection.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for sharing a mobility status in a mobile station with a first subscriber identity card and a second subscriber identity card, comprising:
    obtaining the mobility status indicating the movement extent of the mobile station by the first subscriber identity card being currently camping on a first cell of a first network operator; and
    configuring settings corresponding to a mobility-dependent procedure for the second subscriber identity card being currently failure to camp on any second cell of a second network operator, thereby enabling the mobility-dependent procedure to be performed with consideration of the obtained mobility status,
    wherein the mobility status indicates that the mobile station is fast-moved when a total number of cell reselections for the first subscriber identity card during a past time period is greater than a predetermined threshold.

2. The method as claimed in claim 1, wherein the configuration step further comprises:
    configuring settings to shorten the periodicity of a PLMN recovery procedure for scanning a frequency band to search a Public Land Mobile Network (PLMN) when the mobility status indicates that the mobile station is fast-moved, thereby enabling the PLMN recovery procedure to be performed more frequently.

3. The method as claimed in claim 1, wherein the configuration step further comprises:
    configuring settings to lengthen the periodicity of a PLMN recovery procedure for scanning a frequency band to search a Public Land Mobile Network (PLMN) when the mobility status indicates that the mobile station is slow-moved, thereby enabling the PLMN recovery procedure to be performed less frequently.

4. The method as claimed in claim 3, wherein the mobility status indicates that the mobile station is slow-moved when a total number of cell reselections for the first subscriber identity card during a past time period is less than a predetermined threshold.

5. The method as claimed in claim 4, wherein the configuration step further comprises:
    configuring settings to lengthen the periodicity of a cell selection procedure for searching for a cell of the second network operator when the mobility status indicates that the first subscriber identity card is not cell-changed, thereby enabling the cell selection procedure to be performed less frequently.

6. The method as claimed in claim 1, wherein the configuration step further comprises:
    configuring settings to shorten the periodicity of a cell selection procedure for searching for a cell of the second network operator when the mobility status indicates that the first subscriber identity card is cell-changed, thereby enabling the cell selection procedure to be performed more frequently.

7. The method as claimed in claim 6, wherein the mobility status indicates that the first subscriber identity card is cell-changed when the primary synchronization code or the carrier frequency provided by the first cell is changed.

8. The method as claimed in claim 1, wherein the mobility status is received from system information of a broadcast channel (BCH) of the first cell by the first subscriber identity card.

9. A method for sharing a mobility status in a mobile station with a first subscriber identity card and a second subscriber identity card, comprising:
    obtaining the mobility status indicating the movement extent of the mobile station by the first subscriber identity card being currently camping on a first cell of a first network operator; and
    configuring settings corresponding to a mobility-dependent procedure for the second subscriber identity card being currently camping on a second cell of a second network operator, thereby enabling the mobility-dependent procedure to be performed with consideration of the obtained mobility status, wherein the configuration step further comprises:
        configuring settings to preferably measure signal quality of neighboring cells having larger or equal coverage than or to the second cell when the mobility status indicates that the mobile station is fast-moved, thereby enabling a larger cell to be reselected in a future cell reselection procedure.

10. The method as claimed in claim 9, wherein the configuration step further comprises:

configuring settings to preferably measure signal quality of neighboring cells having smaller or equal coverage than or to the second cell when the mobility status indicates that the mobile station is slow-moved, thereby enabling a smaller cell to be reselected in a future cell reselection procedure.

11. The method as claimed in claim 9, wherein the configuration step further comprises:

configuring settings to reset preferences of the neighboring cells, in which a larger cell with a higher preference, when the mobility status indicates that the mobile station is fast-moved, thereby enabling a future cell reselection procedure to choose a larger cell to camp on.

12. The method as claimed in claim 9, the configuration step further comprises:

configuring settings to reset preferences of the neighboring cells, in which a smaller cell with a higher preference, when the mobility status indicates that the mobile station is slow-moved, thereby enabling a future cell reselection procedure to choose a smaller cell to camp on.

13. The method as claimed in claim 9, the configuration step further comprises:

configuring settings to lengthen the periodicity of a cell reselection procedure for reselecting a suitable cell as a next serving cell when the mobility status indicates that the first subscriber identity card is slow-moved, thereby enabling the cell reselection procedure to be performed less frequently.

14. The method as claimed in claim 9, the configuration step further comprises:

configuring settings to shorten the periodicity of a cell reselection procedure for reselecting a suitable cell as a next serving cell when the mobility status indicates that the first subscriber identity card is fast-moved, thereby enabling the cell reselection procedure to be performed more frequently.

15. A system, comprising:

a processor obtaining a mobility status indicating the movement extent of the mobile station by a first subscriber identity card, which is currently camping on a first cell of a first network operator, and configuring settings corresponding to a mobility-dependent procedure for a second subscriber identity card, thereby enabling the mobility-dependent procedure to be performed with consideration of the obtained mobility status, wherein the mobility status reflects a total number of cell reselections by the first subscriber identity card during a past time period.

16. The system as claimed in claim 15, wherein the mobility status indicates that the mobile station is fast-moved when a total number of cell reselections for the first subscriber identity card during a past time period is greater than a first threshold, and that the mobile station is slow-moved when the total number of cell reselections for the first subscriber identity card during the past time period is less than a second threshold.

17. A system, comprising:

a processor obtaining a mobility status indicating the movement extent of the mobile station by a first subscriber identity card, which is currently camping on a first cell of a first network operator, and configuring settings corresponding to a mobility-dependent procedure for a second subscriber identity card, which is currently failure to camp on any second cell of a second network operator, thereby enabling the mobility-dependent procedure to be performed with consideration of the obtained mobility status, wherein the mobility status reflects a total number of cell reselections by the first subscriber identity card during a past time period.

18. The system as claimed in claim 15, wherein the mobility status is received from system information of a broadcast channel (BCH) of the first cell by the first subscriber identity card.

19. The system as claimed in claim 17, wherein the mobility status indicates that the mobile station is fast-moved when a total number of cell reselections for the first subscriber identity card during a past time period is greater than a first threshold, and that the mobile station is slow-moved when the total number of cell reselections for the first subscriber identity card during the past time period is less than a second threshold.

20. The system as claimed in claim 17, wherein the mobility status is received from system information of a broadcast channel (BCH) of the first cell by the first subscriber identity card.

* * * * *